(12) United States Patent
Choate et al.

(10) Patent No.: US 11,460,116 B2
(45) Date of Patent: Oct. 4, 2022

(54) TOP ENTRY VALVE

(71) Applicant: Baker Hughes Oilfield Operations LLC, Houston, TX (US)

(72) Inventors: Jeremy Choate, Houston, TX (US); Keith M. Adams, Katy, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/212,766

(22) Filed: Mar. 25, 2021

(65) Prior Publication Data

US 2021/0310569 A1 Oct. 7, 2021

Related U.S. Application Data

(60) Provisional application No. 63/003,405, filed on Apr. 1, 2020.

(51) Int. Cl.
*F16K 5/06* (2006.01)
*F16K 5/04* (2006.01)
*F16K 27/06* (2006.01)

(52) U.S. Cl.
CPC .......... *F16K 5/0636* (2013.01); *F16K 5/0492* (2013.01); *F16K 5/0689* (2013.01);
(Continued)

(58) Field of Classification Search
CPC .... F16K 5/0636; F16K 5/0689; F16K 5/0694; F16K 5/0492; F16K 27/065; F16K 27/067
(Continued)

(56) References Cited

U.S. PATENT DOCUMENTS 1,881,269 A * 10/1932 Evans .................. F16K 41/02
277/525
2,868,498 A 1/1959 Kaiser
(Continued)

FOREIGN PATENT DOCUMENTS

EP 1626213 2/2006
WO 2014/105789 7/2014

OTHER PUBLICATIONS

"Introduction to Pressure Seal valves," accessed on Nov. 21, 2019, http://wermac.org/valves/valves_pressure_seal.html, 6 pages.
(Continued)

*Primary Examiner* — John Bastianelli
(74) *Attorney, Agent, or Firm* — Hogan Lovells US LLP (57) ABSTRACT

A valve for regulating a fluid flow includes a body with an opening at a top. The valve also includes a bonnet arranged within the opening, The valve further includes a coupling mechanism joining the body to the bonnet. The coupling mechanism includes a plurality of body lugs extending radially inward toward a stem axis, each body lug of the plurality of body lugs being separated from an adjacent body lug by a body opening. The coupling mechanism also includes a plurality of bonnet lugs extending radially outward from the stem axis, each bonnet lug of the plurality of bonnet lugs being separated from an adjacent bonnet lug by a bonnet opening. Each bonnet lug is adapted to axially move through a corresponding body opening to transition an axial position of the bonnet relative to the body.

6 Claims, 8 Drawing Sheets

(52) U.S. Cl.
    CPC .......... *F16K 5/0694* (2013.01); *F16K 27/065* (2013.01); *F16K 27/067* (2013.01)

(58) Field of Classification Search
    USPC ............... 251/214, 309–312, 315.01–315.16
    See application file for complete search history.

(56) References Cited

U.S. PATENT DOCUMENTS

| | | | |
|---|---|---|---|
| 3,184,212 A * | 5/1965 | Billeter | F16L 29/007 251/105 |
| 5,590,680 A | 1/1997 | Gugala | |
| 6,092,844 A * | 7/2000 | Lee | F16L 37/252 285/179 |
| 6,932,321 B2 | 8/2005 | Baumann | |
| 7,887,024 B2 * | 2/2011 | Timko | F16K 5/0668 251/315.08 |
| 8,783,656 B2 | 7/2014 | Allison | |
| 9,212,758 B2 | 12/2015 | Adams | |
| 9,746,095 B2 | 8/2017 | Kinser | |
| 10,132,422 B2 | 11/2018 | McEvoy | |
| 2012/0299291 A1 | 11/2012 | Kamiya | |

OTHER PUBLICATIONS

International Search Report and Written Opinion dated Jul. 9, 2021 in corresponding PCT Application No. PCT/US2021/024782.

* cited by examiner

TOP ENTRY VALVE

CROSS REFERENCE TO RELATED APPLICATIONS

This application claims the benefit of U.S. Provisional Patent Application No. 63/003,405, filed on Apr. 1, 2020, titled "TOP ENTRY VALVE," the full disclosure of which is hereby incorporated herein in its entirety by reference.

BACKGROUND

1. Field of the Invention

The present disclosure relates in general to valve systems and more particularly to systems and methods for top entry valves.

2. Description of Related Art

A variety of industrial applications may incorporate flow control devices, such as valves, to regulate pressure and flow in different scenarios. For example, oil and gas production may incorporate valves to regulate flow from a wellbore while refining or processing applications may incorporate valves to regulate process flows. In various embodiments, different types of valves may be used, such as ball valves. Ball valves may be utilized for a variety of reasons, such as providing full port flow, quick opening and closing, and advantageous properties for corrosive service. However, typical ball valves are formed by joining a body end to a tail end via fasteners, such as bolts, which may be expensive and time-intensive when repair or maintenance operations are needed.

SUMMARY

Applicants recognized the problems noted above herein and conceived and developed embodiments of systems and methods, according to the present disclosure, for valve systems.

In an embodiment, a valve for regulating a fluid flow includes a body, the body having an inlet and outlet forming a flow passage, the body including an opening at a top. The valve also includes a bonnet arranged within the opening, the bonnet having a bore extending therethrough, wherein a stem extends through the bore. The valve further includes a coupling mechanism joining the body to the bonnet. The coupling mechanism includes a plurality of body lugs, formed in the body, extending radially inward toward a stem axis, each body lug of the plurality of body lugs being separated from an adjacent body lug by a body opening. The coupling mechanism also includes a plurality of bonnet lugs, formed in the bonnet, extending radially outward from the stem axis, each bonnet lug of the plurality of bonnet lugs being separated from an adjacent bonnet lug by a bonnet opening. Each bonnet lug is adapted to axially move through a corresponding body opening to transition an axial position of the bonnet relative to the body, at least one of the bonnet or the body being rotatable relative to the other bonnet or the body to axially align at least one body lug with at least one bonnet lug to block axial movement of the bonnet relative to the body.

In an embodiment, a valve assembly includes an actuator configured to drive movement of a valve stem between a first position and a second position. The valve assembly also includes a valve body, having a chamber for a valve member coupled to the valve stem, wherein movement of the valve stem drives movement of the valve member between the first position and the second position. The valve assembly further includes a bonnet adapted to couple to the valve body at a top portion of the valve body, the bonnet having a plurality of radial bonnet lugs arranged circumferentially about an axis, the plurality of bonnet lugs separated by respective openings positioned between respective bonnet lugs of the plurality of bonnet lugs, the bonnet being translatable along the axis between a coupled position and a decoupled position, wherein the plurality of bonnet lugs move axially through a plurality of valve body openings as the bonnet transitions from the decoupled position to the decoupled position, the bonnet being rotatably placed into the coupled position after moving through the plurality of valve body openings.

In an embodiment, a valve assembly includes a bonnet having a plurality of bonnet lugs extending radially outward from an axis, each bonnet lug being separated from an adjacent bonnet lug by a bonnet opening, and the plurality of bonnet lugs forming at least a portion of a bonnet groove, the bonnet groove being positioned between the plurality of bonnet lugs and an upper region of the bonnet. The valve assembly also includes a body having a plurality of body lugs extending radially inward toward the axis, each valve body lug being separated from an adjacent valve body lug by a body opening, and the plurality of body lugs forming at least a portion of a body slot, wherein the plurality of bonnet lugs are adapted to axially move through respective body openings to position the plurality of bonnet lugs into the body slot. The valve assembly further includes a fastening mechanism positioned to block rotational movement of the bonnet relative to the body in a locked position and to permit rotational movement of the bonnet relative to the body in an unlocked position, the locked position having an extension, associated with the fastening mechanism, extending into at least one bonnet opening or at least one body opening, the extension contacting at least one bonnet lug or body lug responsive to a rotational force being applied to the bonnet.

BRIEF DESCRIPTION OF DRAWINGS

The present technology will be better understood on reading the following detailed description of non-limiting embodiments thereof, and on examining the accompanying drawings, in which.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, like reference numerals may be used for like components, but such use should not be interpreted as limiting the disclosure.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Like numbers may be used to refer to like elements throughout, but it should be appreciated that using like numbers is for convenience and clarity and not intended to limit embodiments of the present disclosure.

Embodiments of the present disclosure are directed toward a top entry valve, such as a ball valve or plug valve, where various internal valve components may be installed from a top area (e.g., perpendicular to a fluid flow path) as opposed to from a side portion (e.g., parallel to the flow path). Such a configuration eliminates a traditional deconstruction of the valve, for example, via fasteners that are utilized to join a body end to a tail end. Traditional bonnets are attached to quarter burn valve bodies using studs and nuts. Machining threaded holes on the body is time consuming and prone to defects. Embodiments of the present disclosure utilize a quick connection system, such as systems described in U.S. patent application Ser. No. 16/829,523, titled "VALVE END REPLACEMENT SYSTEM AND METHOD," filed by Baker Hughes Oilfield Operations LLC, which is hereby incorporated by reference in its entirety. Utilizing this connection is time saving since no torqueing of bonnet bolting is used and machining costs are reduced. Furthermore, parts are minimized, for example, by removing the bolts, nuts, etc. Additionally, embodiments may be compliant with applicable industry standards.

Embodiments of the present disclosure may be directed toward systems and methods for rapid valve repair and construction. For example, in various embodiments, the valve may include at least one quick connection system for coupling a bonnet to the valve. An opening in the valve, for example along a stem axis, may be sized to enable several valve components, such as the stem, valve member, valve seats, etc. to be installed through the top of the valve (e.g., perpendicular to the flow path), thereby eliminating installation from the side of the valve and/or eliminating the decoupling of traditional bonnet configurations. Such a configuration enables a more compact valve format, as well as potentially removes various components such as a fasteners and the like.

Embodiments of the present disclosure may be directed toward an alternative valve body configuration where a body end and a tail end are no longer coupled together at an interface, but rather, where a ball mechanism is utilized within a substantially continuous or solid valve body. In various embodiments, an opening in the valve body may be utilized in place of a separate bonnet to facilitate coupling an actuator to the valve body, thereby providing operational means for the internal components of the valve, such as by rotating a ball between an open position and a closed position. In one or more embodiments, a quick connection system is utilized that includes a lug and space system to enable a bonnet connector and/or a direction connection to an actuator to the valve body. The system may include a series of radially extending lugs on both the valve body and a mating connector, where the lugs may pass axially through spaces between opposing lugs. Thereafter, the mating connector and/or the valve body may be turned to provide axial alignment between the lugs to prevent disconnection of the valve body from the mating connector. In one or more embodiments, a fastening mechanism may be utilized to block rotation of the body or the mating connector absent a certain predetermined condition where rotation is desirable, such as during a maintenance operation. In this manner, access to the internal components of the valve body may be provided rapidly without disassembly of the valve body. Moreover, the mating connector may include a plurality of different end connectors to facilitate operation with a variety of different actuators.

Figure 1:
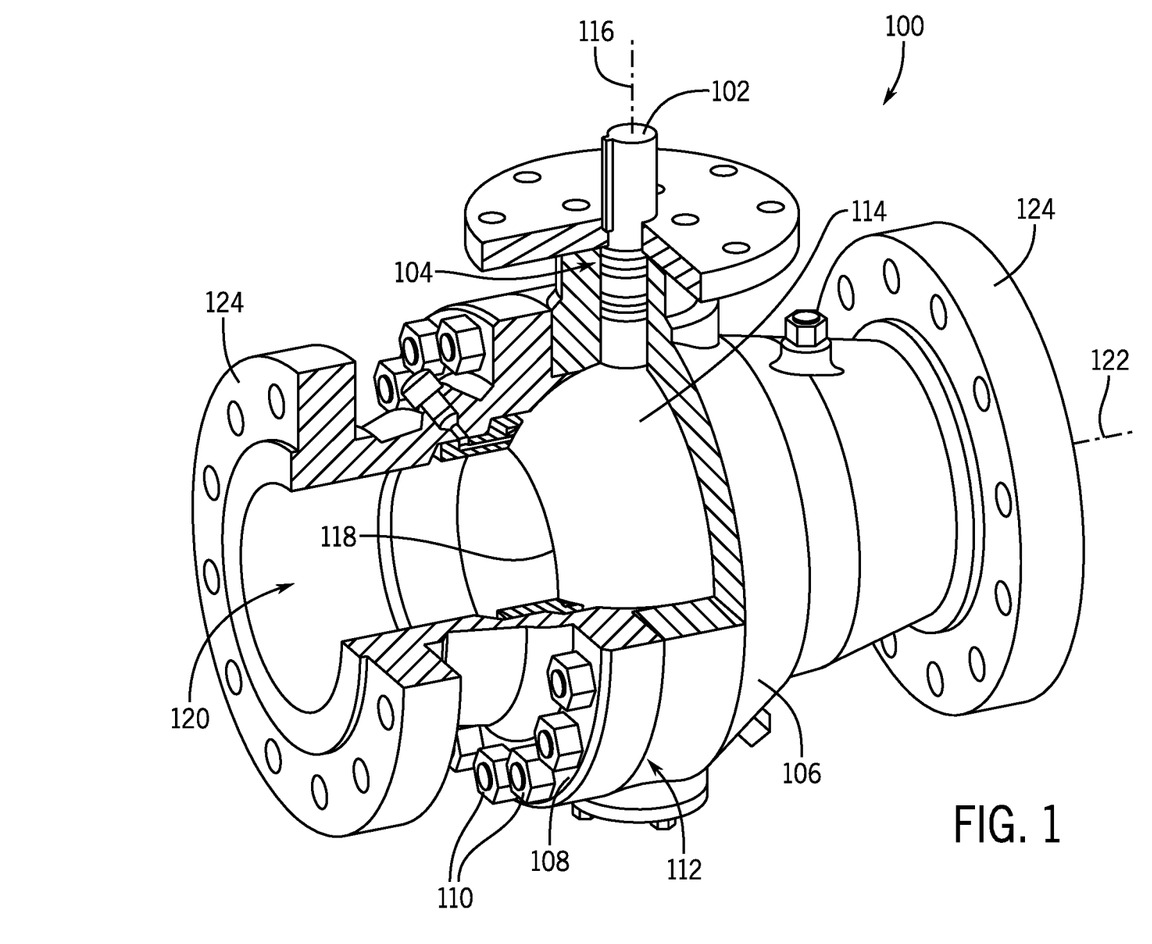
FIG. 1 is a schematic cross-sectional view of an embodiment of a valve assembly, in accordance with embodiments of the present disclosure.

FIG. 1 is a partial sectional view of an embodiment of a valve 100, which is a ball valve in the illustrated embodiment, but may also be incorporated into other types of valves, such as plug valves, in other embodiments. The ball valve 100 includes a stem 102 extending through a bore 104 formed in a body 106 (e.g., body end, body portion). The body 106 is coupled to a tail 108 (e.g, tail end, tail portion) via a plurality of fasteners 110, which are illustrated as bolts in FIG. 1. In various embodiments, these fasteners 110 may be subject to corrosion, due to environmental factors, the fluid flowing through the valve 100, etc. While corrosion inhibiting coatings may be utilized, these are often expensive and have a certain lifespan. Corrosion or other difficulties with the fasteners may lead to a reduced holding capability, which could cause leaks at an interface 112 between the body 106 and the tail 108. Additionally, initial assembly operations may be time consuming due to making the various bolted connections. Furthermore, maintenance operations may also be time consuming due to the bolted connections. For example, in various embodiments, the valve may be wholly disassembled to replace interior components. Furthermore, in configurations where a bonnet is formed in the body 106, machining operations may be time consuming and may also include fasteners.

The valve 100 further includes a ball body 114 coupled to the stem 102. The ball body 114 rotates about a longitudinal axis 116 in response to rotation of the stem 102. In embodiments, the valve 100 may be a quarter turn valve, which enables fast opening and closing of the valve 100. The ball body 114 includes an opening 118 that is aligned with a flow passage 120 having a flow axis 122. The illustrated ball body 114 is in an open position such that the opening 118 is aligned with the flow passage 120 extending through the body 106 and the tail 108. In the closed position, which is not illustrated, the opening 118 may be arranged substantially 90 degrees from the current position such that flow through the flow path 118 is blocked. It should be appreciated that while the illustrated valve 100 includes coupling ends 124 having flanges, that in other embodiments, the coupling ends 124 may be threaded, prepped for welding, or a combination thereof.

Embodiments of the present disclosure are directed toward a quick connection coupling system that enables rapid removal of a bonnet from the valve 100. This quick connection system may not include bolts or fasteners, or may utilize a reduced number of bolts or fasteners, to facilitate improved valve repairs that reduce costs, reduce time, and also reduce a number of components utilized with the valve. Furthermore, systems and methods may also include a valve body that removes the interface 112 to form an integral body for the valve, thereby removing the fasteners 110 and removing potential leak points.

Figure 2:
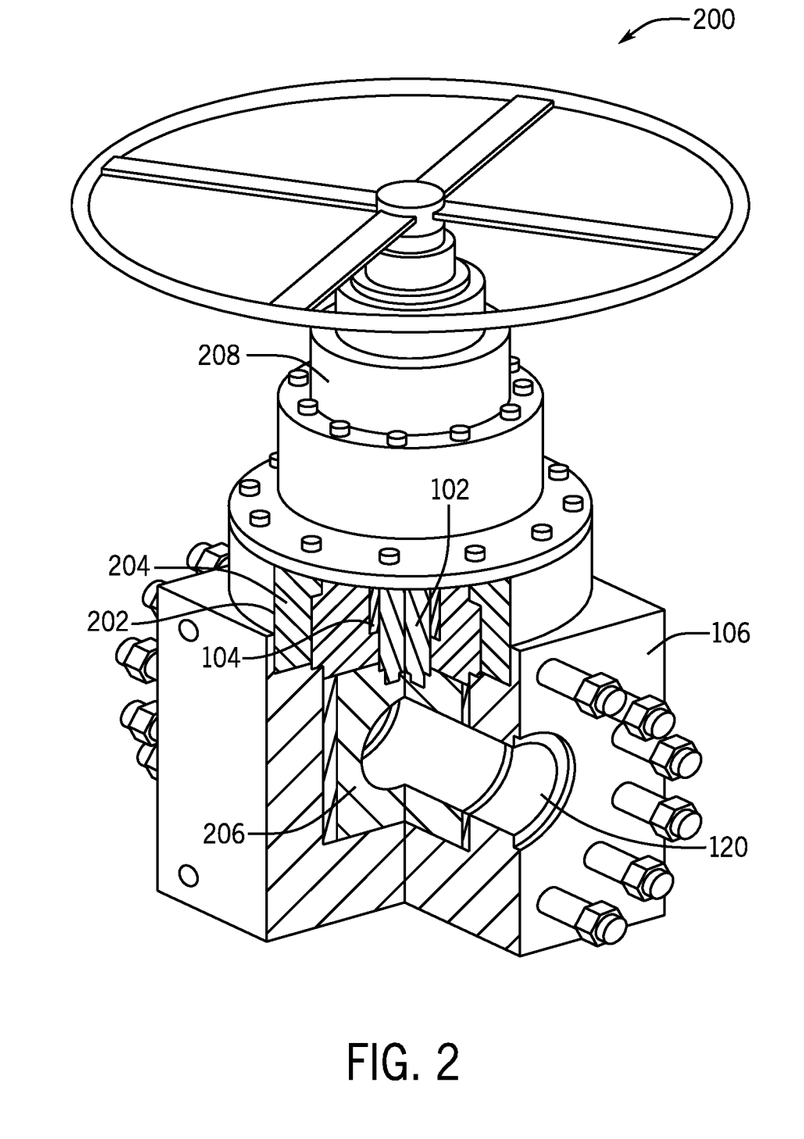
FIG. 2 is a schematic cross-sectional view of an embodiment of a valve assembly, in accordance with embodiments of the present disclosure.

FIG. 2 is a partial sectional view of an embodiment of a valve 200, which in this embodiment is a plug valve. It should be appreciated that certain reference numerals may be carried between figures to describe like components, but such use of reference numerals should not be interpreted as limiting. The illustrated valve 200 also includes the stem 102 extending through the bore 104 formed in the body 106. Further illustrated is a bonnet 202 secured to the body 106 via fasteners 204. Additionally, the ball of the valve 100 is replaced by a plug 206, which is movable between open and closed positions, via the actuator 208, to enable or block flow along the flow passage 120. As previously described, removal of valve components may include removal of the bonnet 202 via the fasteners 204. Such a process may be time consuming and costly. Embodiments of the present disclosure incorporate a quick connection system, which may reduce a number of or remove the fasteners.

Figure 3A:
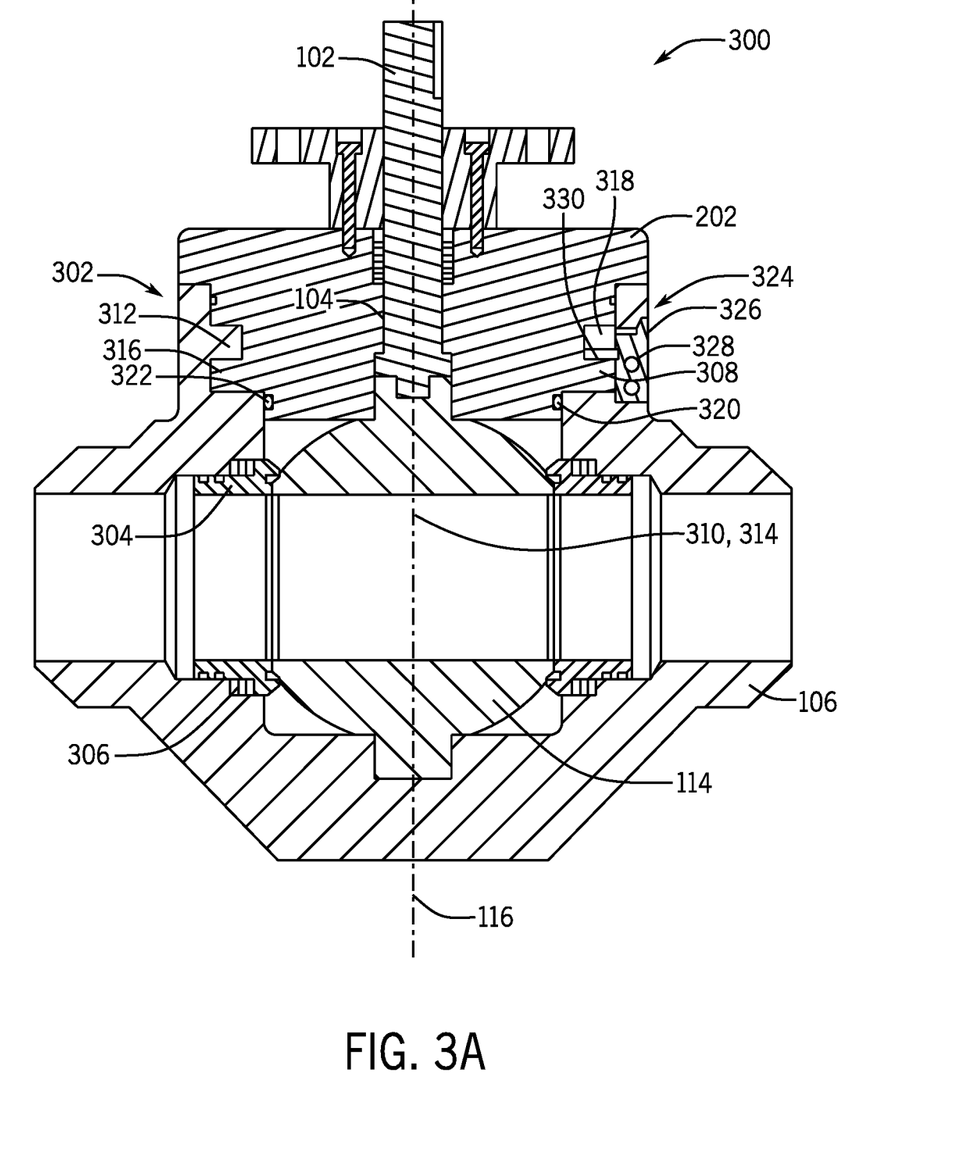
FIG. 3A is a schematic cross-sectional view of an embodiment of a valve assembly including a top entry quick connection system, in accordance with embodiments of the present disclosure.

FIG. 3A is a cross-sectional side elevation view of an embodiment of a valve assembly 300 that shares several similar features with the valve assembly 100 of FIG. 1 and valve 200 of FIG. 2, such as the valve body 106, stem 102, and others, which will be identified with like reference numerals for convenience purposes only and not to limit the scope of the present disclosure. The illustrated valve 300 includes a quick connection system 302 (e.g., coupling mechanism) for coupling the bonnet 202 to the body 106. This quick connection feature may include a series of lugs and openings that interact with lugs and openings formed in the housing, thereby enabling interaction between the components. For example, as will be described below, the lugs associated with the bonnet may pass through openings in the body and then, upon rotation, the lugs of the bonnet may be aligned (e.g., axially aligned) with lugs of the body to block axial movement of the bonnet relative to the body. As previously described, the valve assembly 300 may include a variety of different valve types, such as ball valves, plug valves, and the like. In various embodiments, the valve assembly 300 may be utilized with "quarter turn" valves, however, embodiments are not limited to such valve assemblies.

As noted above, the illustrated embodiment includes the stem 102 extending through the bore 104 to mate with the ball body 114. Rotation of the stem 102 about the stem axis 116 moves the ball between open and closed position to block or enable flow through the flow passage 120. The illustrated embodiment includes valve seats 304, which may be spring loaded (e.g., have resilient features 306) to drive the valve seats 304 against the ball body 114 to block leakage. It should be appreciated that features of the present embodiment may provide additional benefits in addition to the above-described reduction in fasteners for securing the bonnet 202 to the body 106.

Turning back to the quick connection system, the bonnet 202 includes bonnet lugs 308 that extend radially outward from a bonnet axis 310 (which is coaxial with the stem axis 116, in the illustrated embodiment). The bonnet lugs 308 are separated by openings (not pictured) that enable passage of body lugs 312 that extend radially inward toward a body axis 314 (which is coaxial with the stem axis 116, in the illustrated embodiment). For example, the bonnet 202 may be moved axially, relative to the body 106, to enable the bonnet lugs 308 to pass through openings of the body and to enable the body lugs 312 to pass through openings of the bonnet. The bonnet lugs 308 are transitioned into the illustrated slot 316 while the body lugs 312 are positioned within the groove 318. The bonnet 202 may then be rotated, for example less than 90 degrees, to align the bonnet lugs 308 and the body lugs 312. In this manner, axial movement of the bonnet 202 may be blocked.

In various embodiments, the bonnet 202 further includes a seal groove 320 that includes a seal 322. It should be appreciated that in alternative embodiments the groove 320 may be formed in the body 106 and the seal 322 may be associated with the body 106. Furthermore, while one seal is illustrated, more than one seal may be utilized.

In various embodiments, a fastening mechanism 324 may be incorporated to block inadvertent rotation of the bonnet 202. The illustrated fastening mechanism 324 includes a hinged body 326 that rotates about a fastening axis 328 to transition an extension 330 within at least one of the slot 316 and/or the groove 318. In other words, the extension 330 may be positioned in at least one of the openings (e.g., the openings in the body and/or the openings in the bonnet). Accordingly, rotation may be blocked when the fastening mechanism 324 is in a locked or engaged position (illustrated) but enabled when in an unlocked or disengaged position (not pictured).

It should be appreciated that different fastening mechanisms may be utilized than those illustrated in FIG. 3A. For example, because torque may be transmitted through the fastening mechanism 324, different configurations may be utilized in order to block rotation of the bonnet 202. For example, at least one of the bonnet lugs 308 and the body lugs 312 may include an aperture and a rod or component may extend through mating apertures to block rotation. Additionally, in embodiments, fasteners may be incorporated into the bonnet 202 to block rotation. For example, a fastener may be threaded or bolted into the bonnet 202 to extend into at least one of the openings. In this manner, rotation may be blocked in certain situations, but rapidly enabled to facilitate maintenance operations.

While the illustrated embodiment shows the valve 300 having welded connections at the ends, it should be appreciated that various other end connections may be used, such as the flanged connections shown in FIG. 1 or the bolted connections shown in FIG. 2. Accordingly, systems and methods may be incorporated into a variety of different valve configurations. Furthermore, in one or more embodiments, embodiments may further be incorporated into valves that have different end connections at each end, different sizes at each end, or valves with end connections that are rated differently (e.g., different pressure ratings, different corrosion ratings, etc.). Additionally, embodiments of the present disclosure may also be utilized with valves that utilize one or more quick connection systems to rapidly change out end connection types, such as those described in U.S. patent application Ser. No. 16/829,523, titled "VALVE END REPLACEMENT SYSTEM AND METHOD," filed by Baker Hughes Oilfield Operations LLC.

Figure 3B:
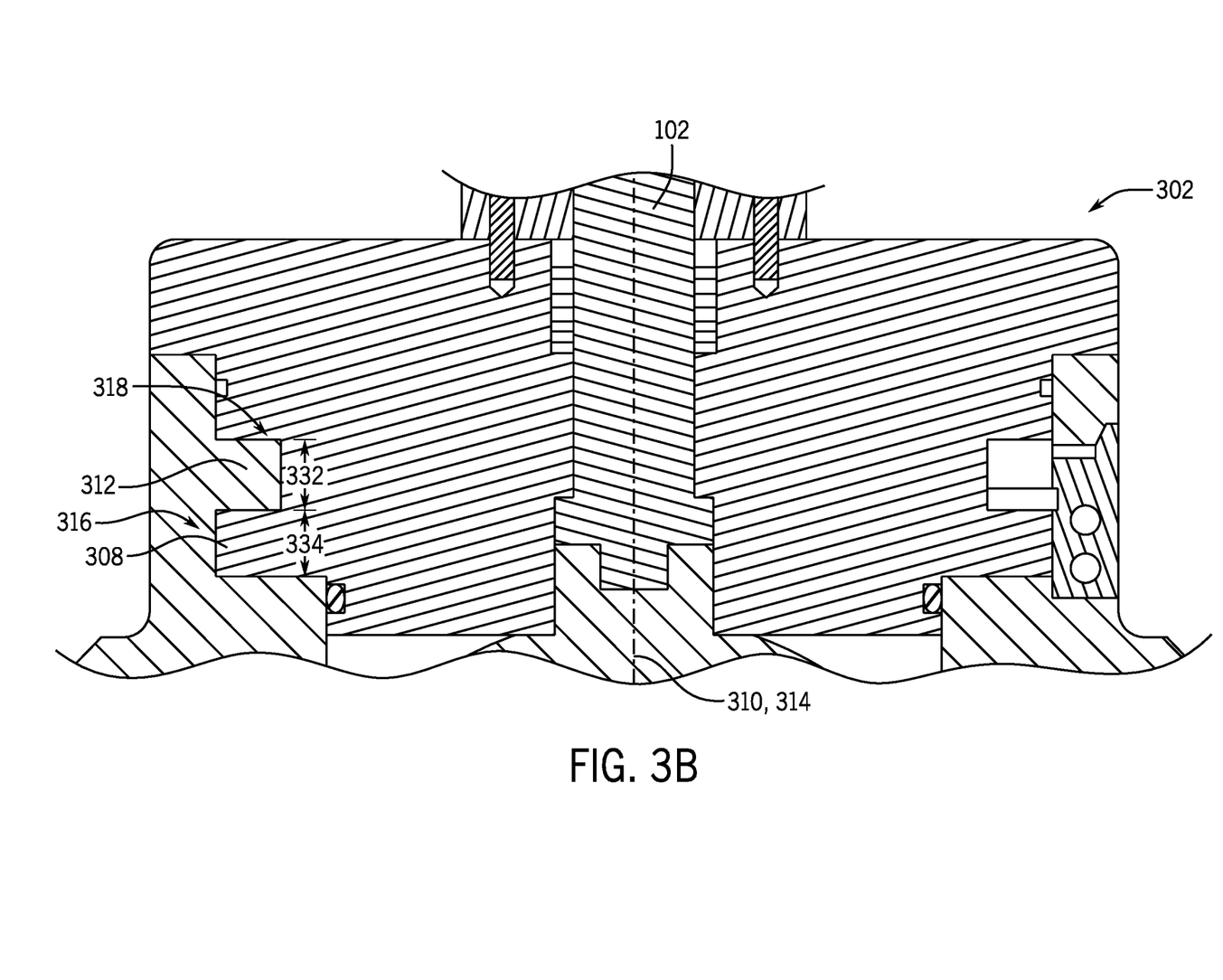
FIG. 3B is a schematic cross-sectional view of an embodiment of a quick connection system, in accordance with embodiments of the present disclosure.

FIG. 3B is cross-sectional view of an embodiment the quick connection system 302 that may be utilized with embodiments of the present disclosure. In this example, the bonnet lugs 308 are positioned within the slot 316 while the body lugs 312 are arranged within the bonnet groove 318. As a result, the illustrated embodiment may be referred to as an engaged position because the bonnet lugs 308 are aligned with the body lugs 312 such that axial movement along the axes 310, 314 is blocked due to interference between the bonnet lugs 308 and the body lugs 312. It should be appreciated that while the illustrated embodiment includes a single row of lugs 308, 312, that other embodiments may include multiple rows of lugs 308, 312. For example, high pressure applications may include multiple different rows to provide further sealing capacity. Furthermore, various dimensions, such as a body lug height 332, a bonnet lug height 334, and the like may be particularly selected based on operating conditions.

Figure 4:
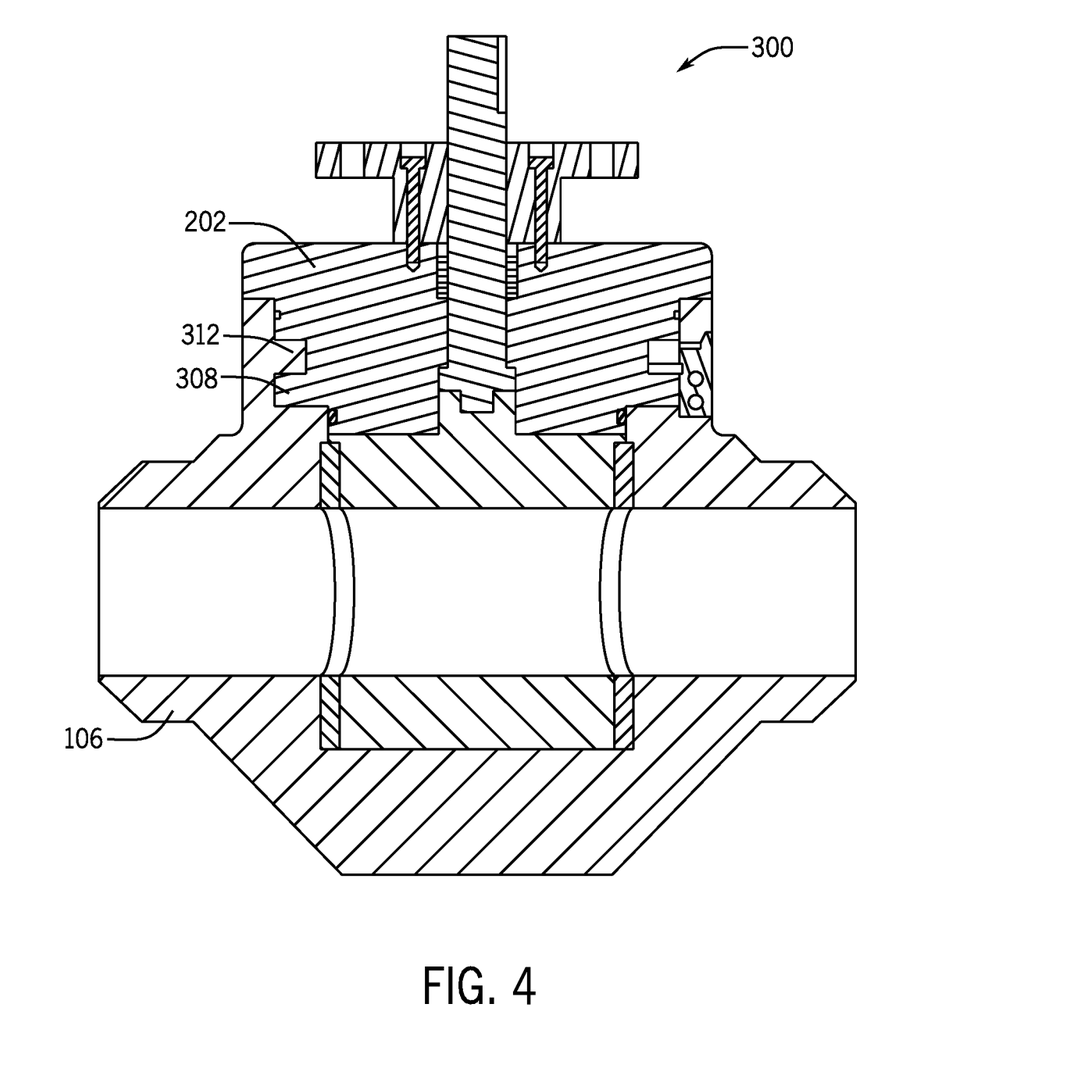
FIG. 4 is a schematic cross-sectional view of an embodiment of a valve assembly including a top entry quick connection system, in accordance with embodiments of the present disclosure.

FIG. 4 is a cross-sectional side view of the valve 300 illustrating a configuration with a plug valve having a quick connection system 302. As noted above, embodiments of the present disclosure may be utilized with a variety of different valve types. In this example, the bonnet lugs 308 have transitioned axially past the body lugs 312 such that they are axially aligned. In other words, upward movement of the bonnet 202, relative to the body 106, would be blocked by interference between the bonnet lugs 308 and the body lugs 312.

Figure 5:
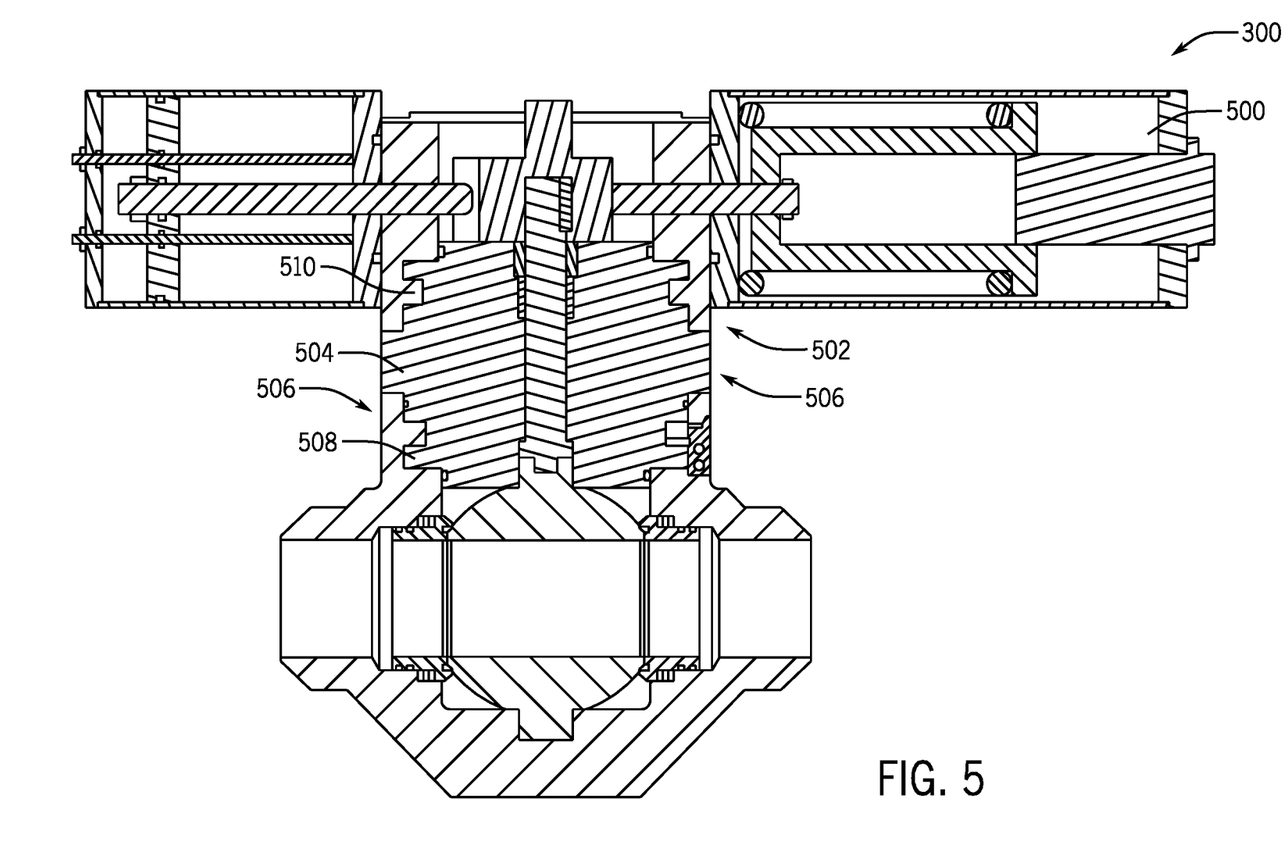
FIG. 5 is a schematic cross-sectional view of an embodiment of a valve assembly including a top entry quick connection system and actuator, in accordance with embodiments of the present disclosure.

FIG. 5 is a cross-sectional side view of the valve 300 including an electric actuator 500 coupled to the bonnet 202 via a second quick connection system 502. It should be appreciated that the second quick connection system 502 may share one or more features with the quick connection system 302 described above. For example, an adapter 504 may be positioned between the electric actuator 500 and the bonnet 202 to facilitate coupling to the body 106. In this example, the adapter 504 includes two different sets 506 of adapter lugs 508, which are similar to the bonnet lugs 308 shown herein. These lugs may interact with the respective body lugs 312 of the body 106 and/or actuator lugs 510 of the electric actuator 500 in order to permit rapid change out of the actuating mechanism utilized with the valve 300. Advantageously, embodiments such as those illustrated in FIG. 5 enable rapid replacement and/or modification of the actuator. For example, the electric actuator 500 could be rapidly replaced with a manual actuator. In various embodiments, such changes may be accomplished without taking the valve out of service.

Figure 6A:
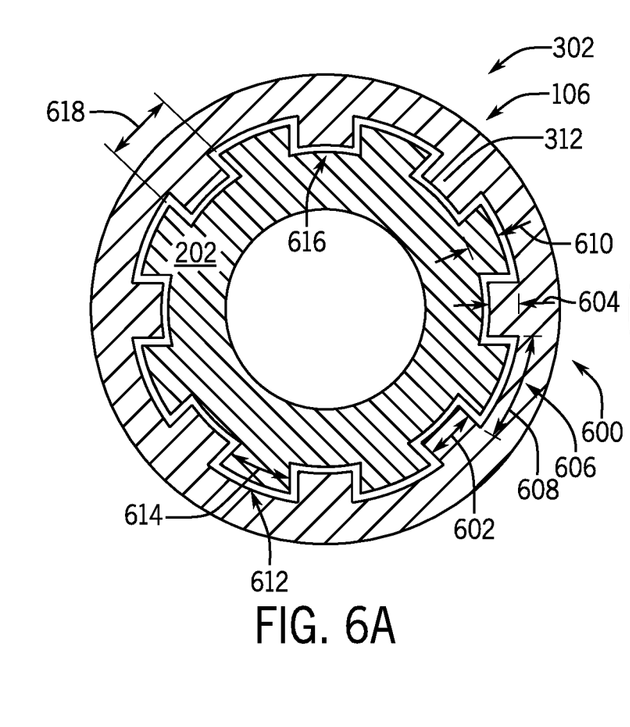
FIGS. 6A and 6B are cross-sectional perspective views of embodiments of a valve assembly including a valve member guide, in accordance with embodiments of the present disclosure.
Figure 6B:
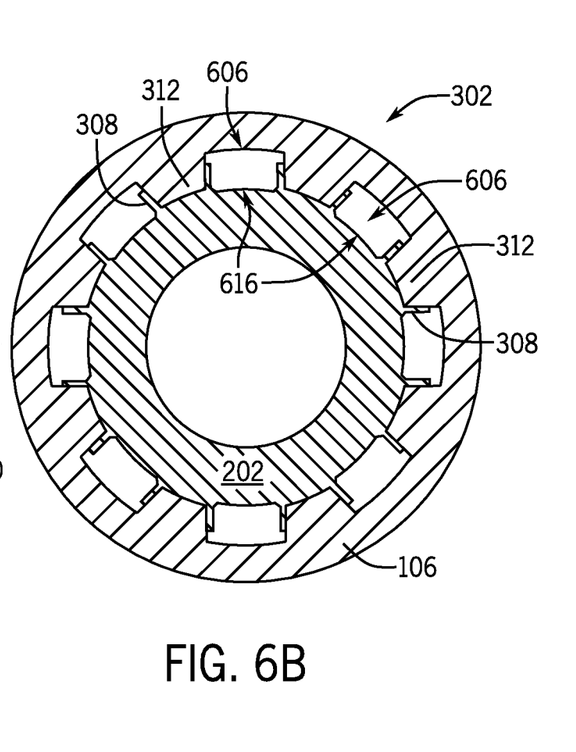

FIGS. 6A and 6B are cross-sectional views of the quick connection mechanism 302 joining the body 106 to the bonnet 202. In the illustrated embodiment, the body 106 is illustrated as being coaxially aligned with the bonnet 202. The body 106 is arranged radially outward from the bonnet 202. However, it should be appreciated that this configuration is for illustrative purposes only and the body 106 may be inward to the bonnet 202 and/or the respective lugs may be flipped to extend in opposite directions. That is, the bonnet 202 may be arranged to overlap and cover a portion of the body 106, as opposed to configurations where the bonnet 202 is positioned within an opening formed in the body 106. As described above, in various embodiments, the body 106 includes the plurality of body lugs 312 arranged circumferentially about an interior circumference 600 of the body 106 for a first distance 602. The illustrated body lugs 312 extend radially inward toward the axis 314 a first radial distance 604. As shown, adjacent body lugs 314 are positioned as being separated from adjacent lugs by the body openings 606, which include a second distance 608.

The illustrated embodiment includes the bonnet 202 having the bonnet lugs 308 extending radially outward a second radial distance 610. The bonnet 202 further includes a plurality of the lugs 308 extending circumferentially about an outer circumference 612 for a third distance 614. As shown, adjacent bonnet lugs 308 are positioned as being separated from adjacent lugs by the bonnet openings 616, which include a fourth distance 614. As described above, the body 106 and the bonnet 202 are arranged such that the bonnet lugs 308 may pass through the body openings 606 and the body lugs 312 may pass through the bonnet openings 616. As a result, axial movement between the bonnet 202 and the body 106 is enabled to facilitate coupling of the components.

FIG. 6B illustrates rotational movement of the bonnet 202 such that the bonnet lugs 308 are aligned with the body lugs 312, blocking axial movement of the bonnet 202 relative to the body 106. In the illustrated embodiment, the respective openings 606, 616 are also aligned. Axial movement of the bonnet 202 relative to the body 106 is blocked by interference between the bonnet lugs 308 and the body lugs 312, and further rotation of the bonnet 202 may be blocked via the fastening mechanism 324, described above. As a result, the components may be coupled together to resist axial movement without including external fasteners.

Figure 7:
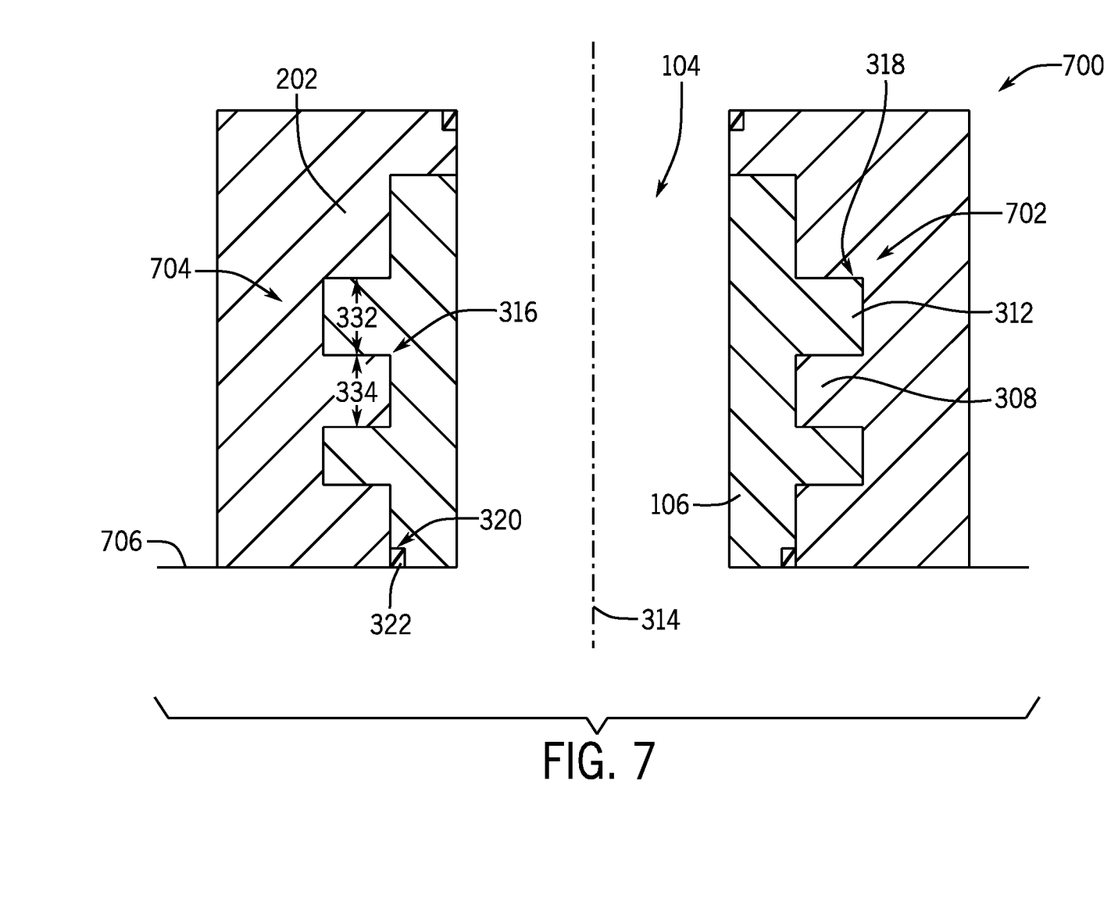
FIG. 7 is a schematic cross-sectional view of an embodiment of a valve assembly including a top entry quick connection system, in accordance with embodiments of the present disclosure.

FIG. 7 is a cross-sectional schematic view of an embodiment of a quick connection system 700 that may be utilized with embodiments of the present disclosure, and moreover, may include one or more similar features to the quick connection systems described herein. In this configuration, the bonnet 202 is arranged external to at least a portion of the body 106. That is, in one or more embodiments, the bonnet 202 is not installed within the bore formed in the body 106, and instead, is positioned co-axially and radially outward from the body 106.

In this example, the bore 104 is illustrated extending through the body 106 and the bore 104 is clear of the bonnet 202. That is, the bonnet 202 is not shown to extend into the bore 104 in this configuration, but rather, rests along the body 106. The illustrated configuration further includes the body lugs 312 extending radially outward from the axis 314 while the bonnet lugs 308 extend radially inward toward the axis 314. As will be appreciated, this may be considered an opposing configuration that that illustrated in FIG. 3, where the lugs 308, 312 were extending in opposite directions when the bonnet 202 was inserted into the bore 104.

This configuration further illustrates the arrangement described above where the bonnet lugs 308 are arranged in different rows 702 and the body lugs 312 are also arranged in different rows 704. That is, there are multiple sets of lugs 308, 312 that are axially spared apart along the axis 314. For example, the bonnet lugs 308 and/or the body lugs 312 may be referred to as a "top lug," a "higher lug", a "lower lug," and/or a "bottom lug" to represent lugs that are axially higher along the axis 314, where a higher lug is further from a top 706 of the body 106 than a bottom.

In the embodiment shown in FIG. 7, the body lugs 312 are positioned within respective grooves 318 formed in the bonnet 202 between axially adjacent bonnet lugs 308 and the bonnet lugs 308 are positioned within respective slots 316 formed in the body 102 between axially adjacent body lugs 312. In other words, a configuration along the axis 314 may have alternating sets of body lugs 312 and bonnet lugs 308 when in a closed or fixed positioned, thereby blocking axial movement of the bonnet 202 with respect to the body 106. In other words, as noted above, at least a portion of the bonnet lugs 308 may overlap at least a portion of the body lugs 312 such that an axial force (e.g., an upward force or a downward force along the axis 314) will drive the lugs 308, 312 together, thereby blocking movement along the axis 314 beyond a predetermined amount, which may corresponding to the respective heights 332, 334 of the lugs 312, 308. That is, the heights 332, 334 may be particularly selected to enable some travel along the axis 314, even when the lugs 308, 312 are aligned. Moreover, it should be appreciated that the heights 332, 334 may be selected based, at least in part, on dimensions of the slot 316 and/or the groove 318.

In various embodiments, the bonnet 202 may be installed over the body 106 such that the bonnet lugs 308 are aligned with openings between the body lugs 312, enabling axial movement of the bonnet 202 in a downward direction (e.g., toward the top 706) along the axis 314. The bonnet 202 may contact the top 706 to illustrate full engagement, however, it should be appreciated that embodiments may not have contact between the bonnet 202 and the top 706. Thereafter, rotation of the bonnet 202 and/or the top 106 may move the bonnet lugs 308 into alignment with the body lugs 312 such that axial movement is blocked. In this manner, the bonnet 202 may be quickly secured to the body 106 without using various fasteners or other external coupling mechanisms. This rapid connection may enable top-entry to replace interior components of various valves, such as quarter turn ball valves, as opposed to the traditional side entry configurations where the valve body is disassembled when internal components are inspected and/or replaced.

The configuration shown in FIG. 7 also illustrates various seals 322, for example the seal 322 arranged within the seal grove 320 formed in the body 106. As noted, the seal groove 320 may also be formed within the bonnet 202 in various embodiments. Additionally, the illustrated embodiment may include the fastening mechanism 324 (not pictured, but shown in FIG. 3) to block rotation of the bonnet 202 and/or the body 106. By way of example, the fastening mechanism 324 may extend into one or more of the openings (FIG. 6) formed between adjacent lugs 308, 312 to block rotation of the bonnet 202 and/or the body 106. Moreover, in various embodiments, the fastening mechanism 324 may include a pin or component that extends through at least one of the lugs 308, 312 to block rotation. Accordingly, the quick connection system 700 may be utilized to rapidly couple the bonnet 202 to the body 106 while reducing or eliminating fasteners typically utilized for such connections.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A valve for regulating a fluid flow, comprising:
a body, the body having an inlet and outlet forming a flow passage, the body including an opening at a top;
a bonnet arranged at least partially within the opening, the bonnet having a bore extending therethrough, wherein a stem extends through the bore;
an actuator configured to drive movement of a valve stem between a first position and a second position; and
a coupling mechanism joining the body to the bonnet and joining the bonnet to the actuator, the coupling mechanism comprising:
a plurality of body lugs, formed in the body, extending radially inward toward a stem axis, each body lug of the plurality of body lugs being separated from an adjacent body lug by a body opening;
a plurality of first bonnet lugs, formed in the bonnet, extending radially outward from the stem axis, each first bonnet lug of the plurality of first bonnet lugs being separated from an adjacent first bonnet lug by a first bonnet opening;
a plurality of second bonnet lugs, formed in the bonnet, extending radially outward from the stem axis, each second bonnet lug of the second plurality of second bonnet lugs being separated from an adjacent second bonnet lug by a second bonnet opening; and
a plurality of actuator lugs, formed in the actuator, extending radially inward toward the stem axis, each actuator lug of the plurality of actuator lugs being separated from an adjacent actuator lug by an actuator opening;
wherein each first bonnet lug is adapted to axially move through a corresponding body opening to transition a first axial position of the bonnet relative to the body, at least one of the bonnet or the body being rotatable relative to the other bonnet or the body to axially align at least one body lug with at least one first bonnet lug to block axial movement of the bonnet relative to the body;
wherein the plurality of body lugs and the plurality of actuator lugs are arranged at different axial positions and the plurality of first bonnet lugs and the plurality of second bonnet lugs are arranged at different axial positions along the bonnet;
wherein each second bonnet lug is adapted to axially move through a corresponding actuator opening to transition a second axial position of the bonnet relative to the actuator, at least one of the bonnet or the actuator being rotatable relative to the other bonnet or the actuator to axially align at least one actuator lug with at least one second bonnet lug to block axial movement of the bonnet relative to the actuator.

2. The valve of claim 1, further comprising:
a body slot formed in the body; and
a bonnet groove formed in a bonnet portion positioned within the opening;
wherein at least one body lug is arranged within the bonnet groove after the bonnet is moved axially with respect to the body.

3. The valve of claim 1, further comprising:
a fastening mechanism, associated with the coupling mechanism, that blocks rotational movement of the at least one of the bonnet or the body when in a locked position and enables rotational moment when in an unlocked position.

4. The valve of claim 1, further comprising:
a seal arranged axially closer to the flow passage than the plurality of bonnet lugs and the plurality of body lugs.

5. The valve of claim 1, wherein the valve is one of a quarter turn ball valve or a plug valve.

6. The valve of claim 1, wherein the valve is a quarter turn ball valve with a unitary body and internal components of the valve are installed through a top of the valve.

* * * * *